(12) United States Patent
Chen

(10) Patent No.: US 9,729,900 B2
(45) Date of Patent: Aug. 8, 2017

(54) METHOD AND ASSOCIATED APPARATUS FOR PROCESSING VIDEO DATA

(71) Applicant: MStar Semiconductor, Inc., Hsinchu Hsien (TW)

(72) Inventor: Jun-Yi Chen, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 790 days.

(21) Appl. No.: 14/144,749

(22) Filed: Dec. 31, 2013

(65) Prior Publication Data

US 2014/0198854 A1    Jul. 17, 2014

(30) Foreign Application Priority Data

Jan. 11, 2013 (TW) .............. 102101146 A

(51) Int. Cl.
*H04N 19/86* (2014.01)
*H04N 19/423* (2014.01)

(52) U.S. Cl.
CPC ........... *H04N 19/86* (2014.11); *H04N 19/423* (2014.11)

(58) Field of Classification Search
CPC ....................................... H04N 19/86
USPC ..................................... 375/240.16
See application file for complete search history.

(56) References Cited

U.S. PATENT DOCUMENTS

2010/0156917 A1\*  6/2010  Lee .............. H04N 19/423
345/543

FOREIGN PATENT DOCUMENTS

| CN | 1424855 | 6/2003 |
| CN | 101022553 | 8/2007 |
| TW | I311728 | 7/2009 |

OTHER PUBLICATIONS

State Intellectual Property Office of the People's Republic of China (SIPO), Office Action dated Sep. 23, 2016.
Taiwan Patent Office "Office Action" dated Sep. 23, 2015.

\* cited by examiner

*Primary Examiner* — Yulin Sun
(74) *Attorney, Agent, or Firm* — WPAT, PC

(57) ABSTRACT

A method and associated apparatus for processing video data are provided. The video data includes a first frame formed by a plurality of macroblocks. The method includes providing a memory, deblocking a first macroblock in the first frame, and writing the deblocked macroblock into the memory. The step of writing the deblocked macroblock lets a plurality of pixel data of the deblocked macroblock to be stored to a first storage space at consecutive addresses in the memory.

17 Claims, 5 Drawing Sheets

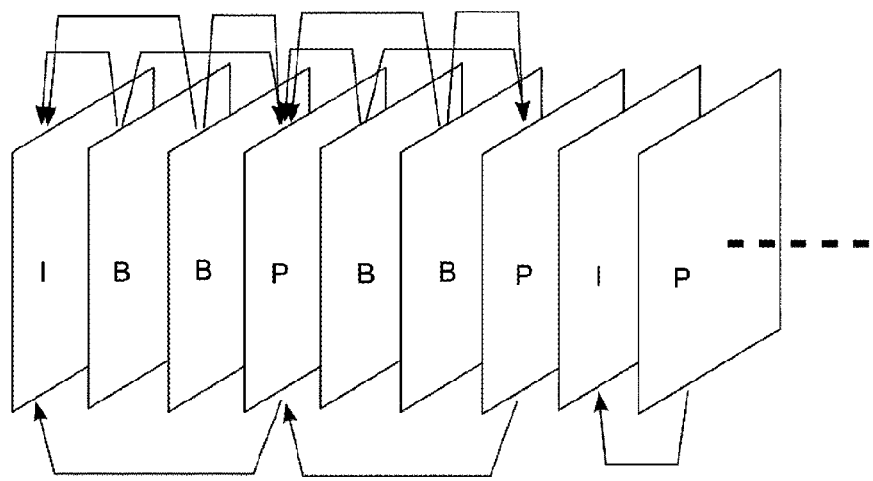
FIG. 1(prior art)
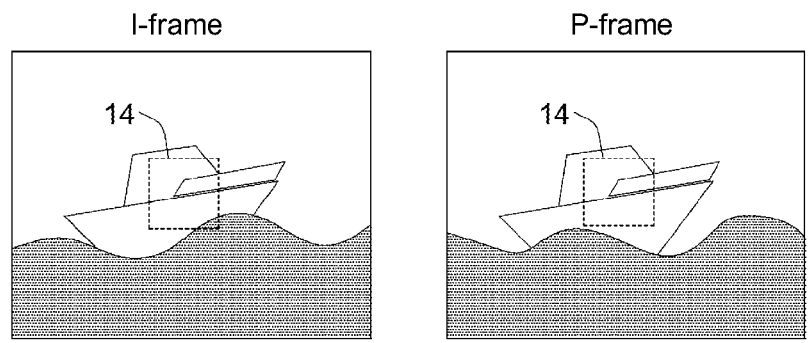
FIG. 2(prior art)
FIG. 3(prior art)

METHOD AND ASSOCIATED APPARATUS FOR PROCESSING VIDEO DATA

This application claims the benefit of Taiwan application Serial No. 102101146, filed Jan. 11, 2013, the subject matter of which is incorporated herein by reference.

BACKGROUND OF THE INVENTION

Field of the Invention

The invention relates in general to a method and associated apparatus for processing video data, more particularly to a processing method and associated capable of effectively reducing the number of times of accessing a memory when encoding and decoding video data.

Description of the Related Art

There are numerous popular compression standards in the compression field for multimedia data. Among the standards, the MPEG-2 defined by Moving Picture Experts Groups is considered a mainstream format.

MPEG-2 defines three image compression modes—an I-frame (an intra coded picture), a P-frame (a predictive coded picture), and a B-frame (a bi-directionally predicted picture). The I-frame can be independently encoded and decoded, and can serve as a reference image source for P-frames and B-frames. However, as the I-frame is not benefited from the elimination of temporal redundancies, the I-frame has a less satisfactory compression rate. In encoding and decoding, the P-frame may regard a closest precedent I-frame or P-frame as a reference picture. If corresponding similar macroblocks can be found in a reference picture from macroblocks of the P-frame, predictive code is performed by motion compensation, or else motion compensation encoding is performed based on the intra mode. Further, the P-frame achieves a greater encoding rate as the technology of eliminating temporal redundancies is incorporated. The B-frame, similar to the P-frame, utilizes precedent and subsequent I-frame and P-frame in a playback sequence as reference pictures in encoding and decoding. Among the three types of frames, the B-frame has the highest encoding efficiency. FIG. 1 shows an example of relationships of the I-frames, the P-frames and the B-frames.

Motion compensation has a prediction capability for inside and outside a picture. When motion compensating the outside of a picture, a reference picture is searched to identify corresponding macroblocks for macroblocks of a P-frame or B-frame. As shown in FIG. 2, when encoding a macroblock 12 of the P-frame on the right, it is found that a corresponding macroblock 14 in the I-frame as the reference picture is extremely similar, and so the encoding of the macroblock 12 is performed by adopting predictive encoding, and a motion vector and a prediction error are generated.

Each encoded macroblock contains motion compensated prediction information, which includes motion vectors and prediction errors after the encoding process. A macroblock is categorized into four types—intra-predicted, forward-predicted, backward-predicted and averaged. The I-frame contains only intra-predicted macroblocks; the P-frame contains only intra-predicted and forward-predicted macroblocks; and the B-frame contains all of the four types of macroblocks. Except for the intra-predicted macroblocks, the other macroblocks are generally referred to as non-intra macroblocks.

FIG. 3 shows a picture consisted of 100 macroblocks forming a 10×10 matrix. The 100 macroblocks are denoted as MB(i, j), respectively, where i=0 to 9 and j=0 to 9, as shown in FIG. 3. FIG. 4 shows pixel data in one macroblock MB(i, j) under a 4:2:0 sampling format. One macroblock MB(i, j) is formed by four luminance (Y) blocks and two chrominance (U and V) blocks. Each block contains 8×8 pixel data. The four Y blocks 16 have 16×16 Y pixel data respectively represented as $Y_{i,j}(x, y)$, where x=0 to 15 and y=0 to 15. The U block and the V block are similar. For example, the V block 20 includes 8×8 V pixel data respectively represented as $V_{i,j}(m, n)$, where m=0 to 7 and n=0 to 7.

In one picture, all of the Y blocks form a Y frame, all of the U blocks form a U frame, and all of the V blocks from a V frame.

A reference picture needs to be stored in a buffer, so that it can be accessed in an encoding or decoding process. Intuitively, a reference picture can be in a unit of frames and stored in a memory. FIG. 5 shows a storage and arrangement method of a Y frame stored in a dynamic random access memory (DRAM) 21 serving as a buffer. In simple, all of the Y pixel data $Y_{i,j}(x, y)$ in the Y frame are sequentially stored into corresponding memory address from left to right and from top to bottom by a raster scan. In FIG. 5, there are a total of 160×160 bytes (from addresses $AD_S$ to $AD_S+160\times160-1$). The 160 Y pixel data $Y_{0,0}(0, 0)$ to $Y_{0,9}(0, 15)$ of the first row of the Y frame are stored to 160 bytes starting from the starting address $AD_S$. The 160 Y pixel data $Y_{0,0}(1, 0)$ to $Y_{0,9}(1, 15)$ of the second row of the Y frame are stored to 160 bytes starting from the starting address $AD_S+160$.

The arrangement in FIG. 5 is inconvenient for motion compensation. Assuming an MPEG encoder/decoder includes a line buffer memory having a capacity of 160 bytes, it means that 160 bytes at consecutive addresses of the DRAM can be accessed each time and temporarily stored. FIG. 6 shows a reference picture 22 and a corresponding macroblock 23 found therein. The corresponding macroblock 23 is located across the macroblocks MB(0, 1), MB(0, 2), MB(1, 1) and MB(1, 2). Assuming that the reference picture 22 is a Y frame, and is stored in the DRAM 21 according to the arrangement in FIG. 5. That is, the line buffer memory needs to access the DRAM 21 16 times in order to completely obtain all of the 16×16 Y pixel data of the corresponding macroblock 23. A dotted region 24 in FIG. 6 indicates the pixel data having been accessed by the line buffer memory when accessing the corresponding macroblock 23. As such, the access efficiency (defined as a ratio of required data to a total of data actually accessed) is (16×16)/(160×16), which is non-ideal. The encoding and decoding performance is thus reduced.

SUMMARY OF THE INVENTION

According to an embodiment the present invention, a method for processing video data is provided. The video data includes a first frame formed by a plurality of macroblocks. The method includes: providing a memory, deblocking a first macroblock in the first frame, and writing the deblocked macroblock into the memory. The step of writing the deblocked macroblock into the memory lets a plurality of pixel data of the deblocked macroblock be stored to a first storage space at consecutive addresses in the memory.

According to another embodiment of the present invention, an apparatus for processing video data is provided. The video data includes a first frame formed by a plurality of macroblocks. The apparatus includes a memory and a deblocking filter. The deblocking filter deblocks a first macroblock in the first frame, and writes the deblocked macroblock into the memory to let a plurality of pixel data of the processed macroblock be stored to a first storage space at consecutive addresses in the memory.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1 is an example of reference relationships of I-frames, P-frames and B-frames;

FIG. 2 is a corresponding macroblock found in an I-frame for a P-frame;

FIG. 3 is an example of a picture formed by 100 macroblocks;

DETAILED DESCRIPTION OF THE INVENTION

Figure 7:
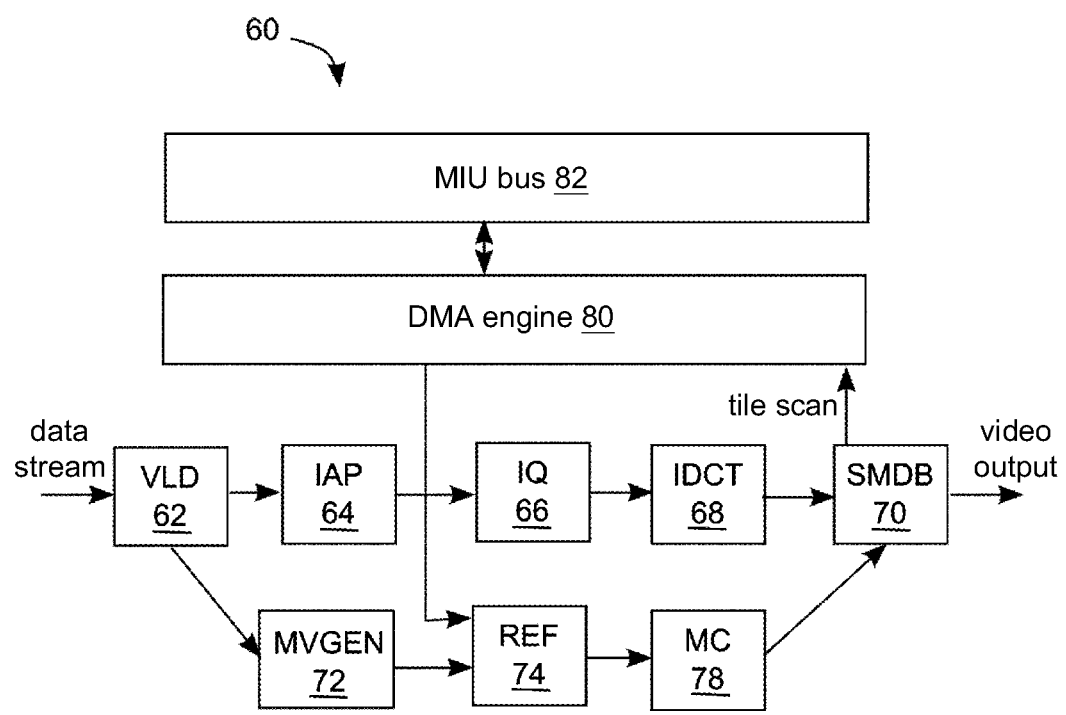
FIG. 7 is an MPEG decoder according to an embodiment of the present invention.

FIG. 7 shows an MPEG decoder 60 according to an embodiment of the present invention. The MPEG decoder 60 includes a variable length decoder (VLD) 62, an intra prediction processor 64, an inverse quantizer 66, an inverse discrete cosine transformer 68, a deblocking filter 70, a motion vector generator 72, a reference macroblock generator 74, a motion compensator 78, a direct memory access (DMA) engine 80, and a memory interface unit (MIU) bus 82.

When processing a digital video data stream of encoded intra-predicted macroblocks, the VLD 62 restores an original data stream that is not processed by variable length encoding. The intra prediction processor 64 generates a macroblock from decoded but not yet deblocked macroblocks in a same picture according to a motion vector of the original data stream. The inverse quantizer 66 restores a prediction error in the original data stream into a discrete cosine transform (DCT) coefficient according to a selected quantization scale. The inverse discrete cosine transformer 68 generates a corresponding error macroblock according to the DCT coefficient. The reference macroblock is modified according to the corresponding error macroblock into a macroblock not yet filtered. The deblocking filter 70 collects the macroblock not yet filtered, and smoothes an edge between macroblocks in a picture.

When processing the digital video data stream of encoded non-intra-predicted macroblocks, the VLD 62 also restores an original data stream that is not processed by variable length encoding. The inverse quantizer 66 restores a prediction error in the original data stream into a DCT coefficient according to a selected quantization scale. The inverse discrete cosine transformer 68 generates a corresponding error macroblock according to the DCT coefficient. In parallel, the motion vector generator 72 generates a motion vector according to the original data stream. The reference macroblock generator 74 raises a request for accessing the DRAM via the DMA engine 80 according to the motion vector. That is, from one or two reference pictures stored in the DRAM serving as a buffer, one or two corresponding macroblocks are accessed. When there are two corresponding macroblocks, the motion compensator 78 combines the two into one. The error macroblock generated by the inverse discrete cosine transformer 68 is integrated with the corresponding macroblock into a macroblock not yet filtered and to be collected by the deblocking filter 70. The deblocking filter 70 smoothes an edge between macroblocks in a picture.

When a picture currently processed by the MPEG decoder 60 is a B-frame, the deblocking filer 70 outputs all of the macroblocks as video data. When a picture currently processed is an I-frame or a P-frame, the deblocking filter 70 provides an arrangement rule (to be explained shortly) of tile scan, and forwards all of the macroblocks to the MIU bus 82 via the DMA engine 80 into the corresponding DRAM.

Figure 4:
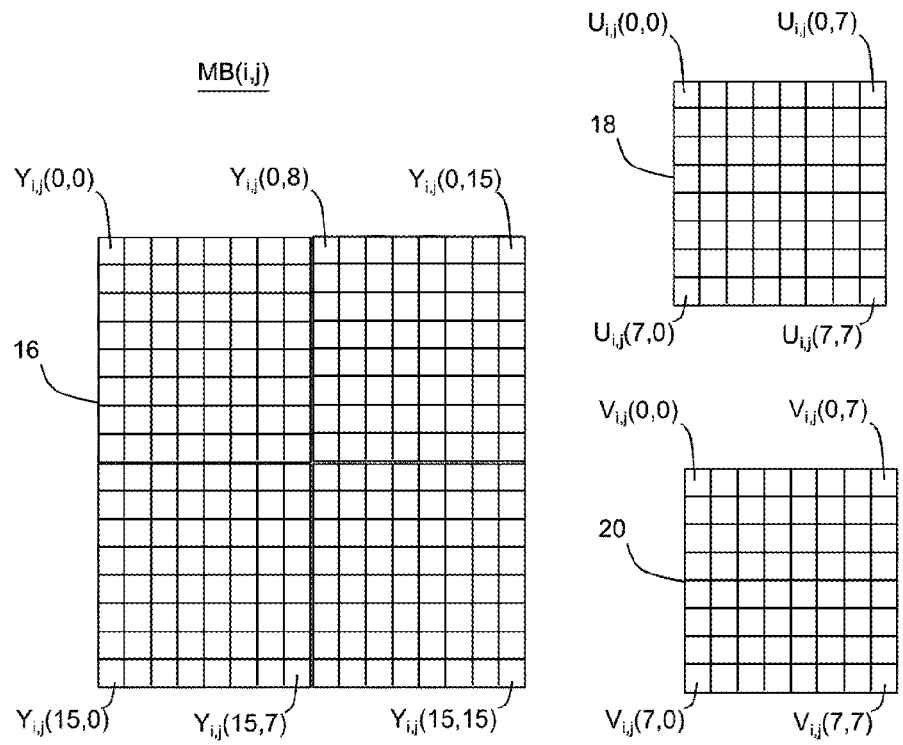
FIG. 4 shows pixel data in a macroblock MB(i, j) under a 4:2:0 sampling format.
Figure 5:
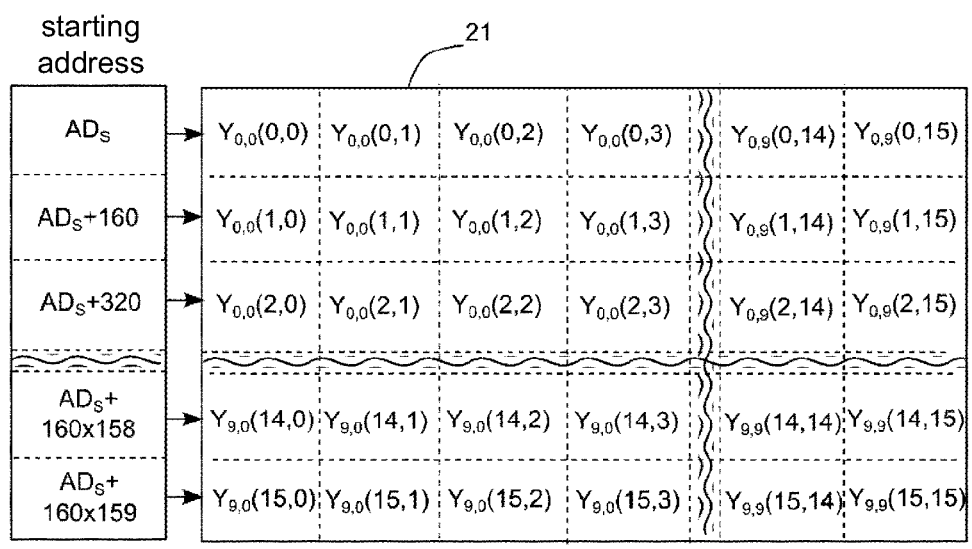
FIG. 5 shows a storage and arrangement method of a Y frame in a DRAM serving as a buffer in the prior art.
Figure 6:
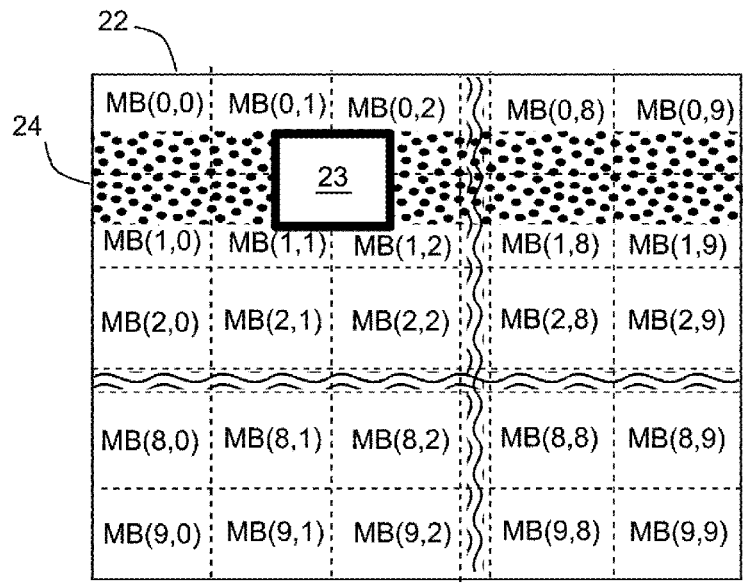
FIG. 6 is a reference picture and a corresponding macroblock found therein.

With reference to the picture in FIG. 3 and the pixel data in FIG. 4, an example is given for explaining how a reference picture is arranged and stored in a DRAM according to an embodiment of the present invention.

Figure 8:
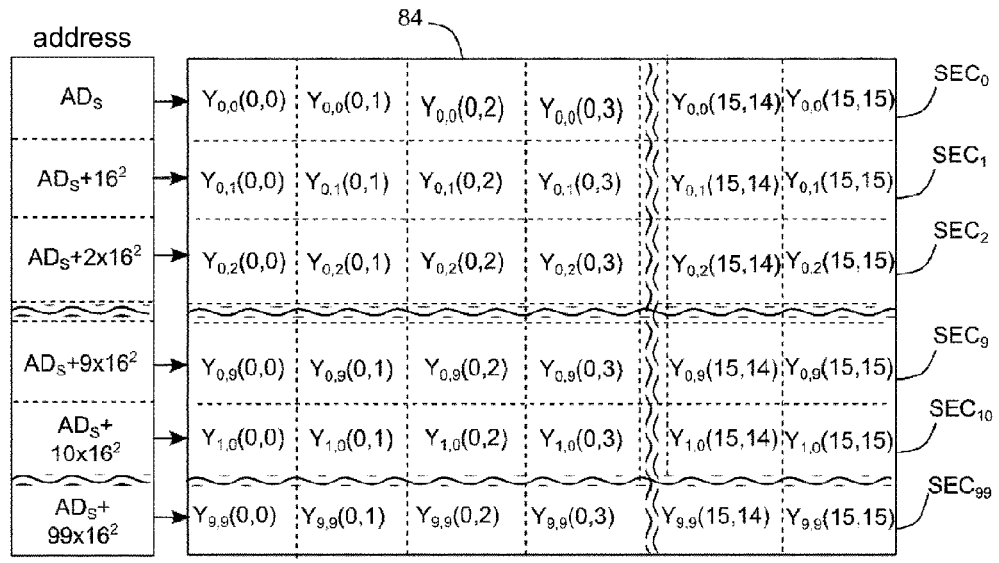
FIG. 8 is a storage and arrangement method of a Y frame in a DRAM serving as a buffer.

FIG. 8 shows a storage and arrangement method of a Y frame in the picture in FIG. 3 in the DRAM. From the perspective of addresses, the DRAM 84 may be divided into many continuous segments $SEC_0$ to $SEC_{99}$. In FIG. 8, the 16×16 bytes at the address $AD_S$ to $AD_S+16^2-1$ are the segment $SEC_0$, the following 16×16 bytes (at the addresses $AD_S+16×16$ to $AD_S+2×16^2-1$) are the segment $SEC_1$, and so forth.

The deblocking filter 70 in FIG. 7 sequentially stores the Y pixel data of macroblocks of a reference picture into the segments $SEC_0$ to $SEC_{99}$ in the DRAM 84 by tile scan. Thus, as shown in FIG. 8, all of the Y pixel data $Y_{0,0}(0, 0)$ to $Y_{0,0}(15, 15)$, that is 16×16 Y pixel data in total, is stored into the segment $SEC_0$; the 16×16 pixel data in the macroblock MB(0, 1) is stored into the segment $SEC_1$; the Y pixel data of the macroblock MB(0, 9) is stored into the segment $SEC_9$; the Y pixel data of the macroblock MB(1, 0) adjacently follows the Y pixel data of the macroblock MB(0, 9) and is stored into the segment $SEC_{10}$; and the 16×16 Y pixel data of the lower-right macroblock MB(9, 9) is stored into the segment $SEC_{99}$.

Taking the macroblock MB(0, 0) for example, the Y pixel data therein is sequentially stored into a corresponding memory space at the segment $SEC_0$ from left to right and from top to bottom according to a raster scan. Thus, in the memory, the Y pixel data $Y_{0,0}(0, 0)$ to $Y_{0,0}(0, 15)$ is stored into the 16 consecutive bytes starting from the address $AD_S$, and the Y pixel data $Y_{0,0}(1, 0)$ to $Y_{0,0}(1, 15)$ is stored into the adjacently following address. Accordingly, the memory address, in the DRAM 84, to which one Y pixel data $Y_{i,j}(m, n)$ is stored can be represented by equation (1) below:

$$AD_S+J*M*N*i+M*N*j+N*m+n \qquad \text{equation (1)}$$

In the above equation, J is a total number of macroblocks at a same row in one Y frame, M is a total number of rows of Y pixel data in one macroblock, and N is a total number of Y pixel data at a same row. In the example in FIG. 8, J=10, and M=N=16. According to equation (1), the deblocking filter 70 may stored all the Y pixel data of one Y frame into corresponding memory addresses.

FIG. 8 is an example according to an embodiment of the present invention, and is not to be construed as limiting the present invention. In an alternative embodiment of the present invention, the Y pixel data is not limited to an arrangement based on a raster scan, given that the Y pixel data in each macroblock is together stored into a segment in the DRAM.

Assuming the MPEG decoder 60 in FIG. 7 also includes a line buffer memory with a capacity of 160 bytes, it means that 160 bytes at consecutive addresses of the DRAM can be accessed and temporarily stored each time. The capacity of the line buffer memory stores exactly 160 Y pixel data of one scan line in a Y frame. The deblocking filer 70 may provide a starting address, and provides the 160 Y pixel data at the consecutive addresses to the DMA engine 80 according to a storage and arrangement method defined according to FIG. 8. The DMA engine 80 may quickly forward the Y pixel data received to 160 bytes at corresponding consecutive addresses via the MIU bus 82.

Figure 9:
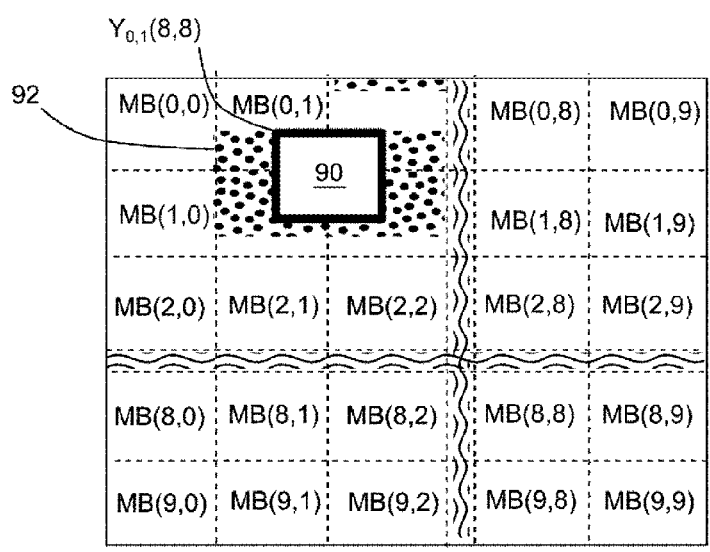
FIG. 9 is a reference picture and a corresponding macroblock found therein.

Conversely, to generate a reference macroblock, the reference macroblock generator 74 can learn the storage addresses at which all of the Y pixel data of the reference macroblock is stored in the DRAM 84 according to the storage and arrangement method in FIG. 8 or defined by equation (1). The reference macroblock generator 74 may access 160 bytes at consecutive addresses in the DRAM 84 each time for several times, and acquire a part that belongs to the reference macroblock to generate the reference macroblock. For example, according to the motion vector, the reference macroblock generator 74 may learn that the upper-left part of a reference macroblock 90 is the Y pixel data $Y_{0,1}(8, 8)$, as shown in FIG. 9. It is known from FIG. 8 or equation (1) that, the address at which the Y pixel data $Y_{0,1}(8, 8)$ is stored in the DRAM 84 is $AD_S+16^2+16\times 8+8=(AD_S+376)$. When accessing for the first time, the reference macroblock generator 74 provides the address $AD_S+376$ to the DMA engine 80. The DMA engine 80, regarding the address $AD_S+376$ as an access starting address, accesses 160 Y pixel data at consecutive addresses. The reference macroblock generator 74 acquires 64 Y pixel data $Y_{0,1}(8$ to $15$, $8$ to $15)$ therefrom. When accessing for the second time, the DMA engine 80, starting from the corresponding address $AD_S+16^2\times 2+16\times 8$ of the Y pixel data $Y_{0,2}(8,0)$, accesses 160 bytes at consecutive addresses, and the reference macroblock generator 74 acquires 64 Y pixel data $Y_{0,2}(8$ to $15$, $0$ to $7)$ therefrom. Similarly, after accessing 160 Y pixel data for the third time, the reference macroblock generator 74 acquires 64 Y pixel data $Y_{1,1}(0$ to $7, 8$ to $15)$; after accessing 160 Y pixel data for the fourth time, the Y pixel data $Y_{1,2}(0$ to $7, 0$ to $7)$ is acquired. The Y pixel data $Y_{0,1}(8$ to $15, 8$ to $15)$, $Y_{0,2}(8$ to $15, 0$ to $7)$, $Y_{1,1}(0$ to $7, 8$ to $15)$ and $Y_{1,2}(0$ to $7, 0$ to $7)$ jointly form the reference macroblock 90. A dotted region 92 in FIG. 9 represents the pixel data having been accessed by the line buffer memory for generating the reference macroblock 90. In the embodiment, the access efficiency is equal to $(16\times 16)/(160\times 4)$. Compared to the access efficiency $((16\times 16)/(160\times 16))$ of the prior art, the embodiment of the present invention reduces the number of times of accessing the DRAM and thus increases the access efficiency.

Figure 10:
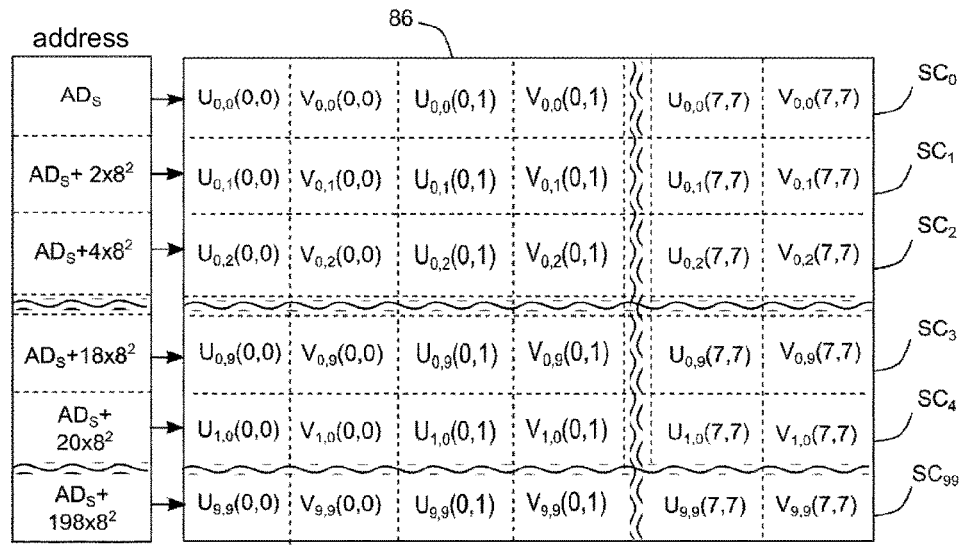
FIG. 10 is a storage and arrangement method of U and V frames in a reference picture stored in a DRAM.

FIG. 10 shows a storage and arrangement method of U and V frames of a reference picture in a DRAM 86. Similarly, the deblocking filter 70 sequentially stores U and V pixel data of macroblocks of the reference picture into a plurality of segments $SC_0$ to $SC_{99}$ of the DRAM 86 by tile scan. In FIG. 10, each segment has 128 ($=8^2\times 2$) bytes. Although the U and V pixel data is also stored in a corresponding segment by a raster scan, the U and V pixel data is however arranged in alternating colors in one segment. As shown in FIG. 10, the storage address of one V pixel data adjacently follows the storage address of one U pixel data, and vice versa. In FIG. 10, all of the U and V pixel data of the macroblock MB(0, 0) is stored in the segment $SC_0$ including bytes at the addresses $AD_S$ to $AD_S+128$. The segment $SC_1$ stores all of the U and V pixel data of the macroblock MB(0, 1).

The arrangement in FIG. 10 provides an advantage. That is, when accessing two reference macroblocks formed by the U and V pixel data, both of the U and V data can be accessed each time the line buffer memory accesses the DRAM, thereby achieving considerable access efficiency.

Figure 11:
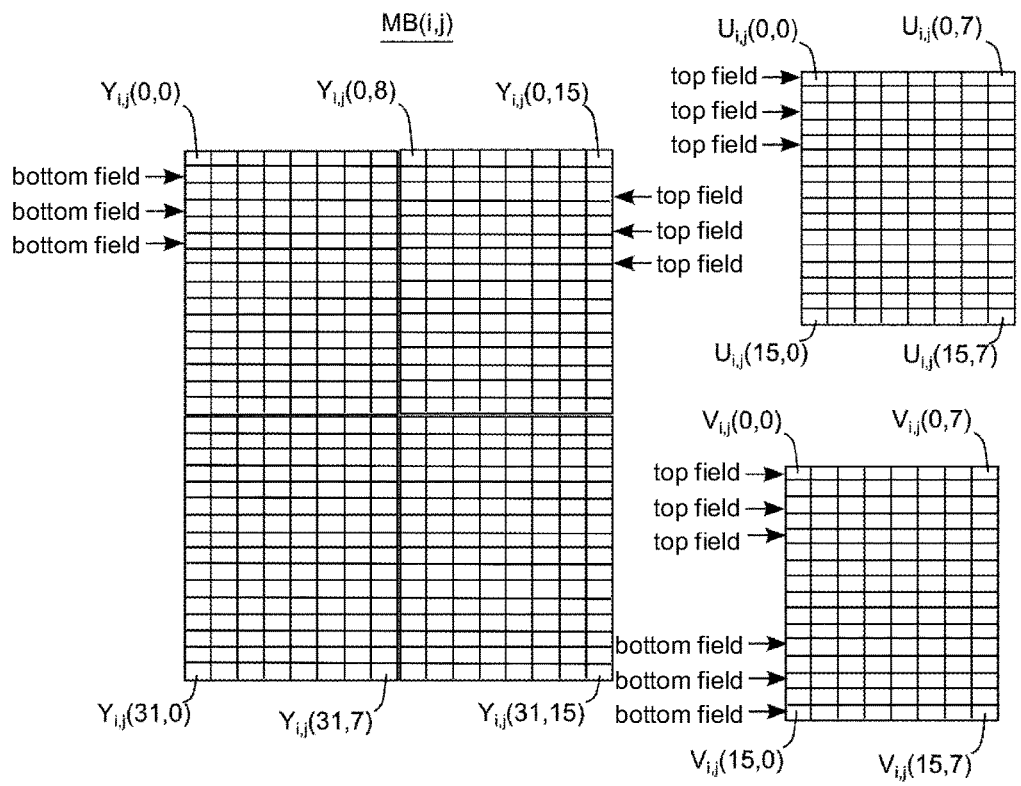
FIG. 11 is a macroblock defined based on tile scan.

Tile scan refers to a method in which macroblocks are sequentially stored into a DRAM one after another. In the embodiment above, for illustration purposes, a macroblock for storing into one segment based on tile scan is defined as a macroblock defined by MPEG in FIG. 4. In another embodiment of the present invention, a macroblock defined by tile scan is not necessarily consistent with a macroblock defined by MPEG encoding and decoding. FIG. 11 shows a macroblock defined based on tile scan. In FIG. 11, one macroblock MB(i, j) contains $16\times 32$ Y pixel data, $8\times 16$ V pixel data, and $8\times 16$ U pixel data. Taking the Y pixel data for example, in FIG. 11, the Y pixel data $Y_{i,j}(0, 0)$ to $Y_{i,j}(0, 15)$ at the first row belongs to a top field of an interlaced-scanned image, the pixel data $Y_{i,j}(1, 0)$ to $Y_{i,j}(1, 15)$ at the second row belongs to a bottom field, the third row belongs to a top field, and so forth. The U and V pixel data in FIG. 11, similar to the Y pixel data, also belongs to top and bottom fields. The MPEG decoder 60 in FIG. 7 may adopt the macroblock definition in FIG. 11 for tile scan. For example, with the deblocking filter 70, the Y pixel of one macroblock defined in FIG. 11 is arranged and stored into a segment at consecutive addresses in the DRAM by a raster scan. Thus, from the perspective of DRAM addresses, one row of Y pixel data that belongs to a top field adjacently follows the another row of Y pixel data that belongs to a bottom field, with the another row of Y pixel data that belongs to a bottom field also adjacently following yet another row of Y pixel data that belongs to a top field. In other words, the Y pixel data of top and bottom fields, by alternating rows, are arranged and stored in the DRAM. The U and V pixel data in FIG. 11 may be stored in a DRAM according to the storage and arrangement method in FIG. 10.

Compared to the prior art, the MPEG decoder disclosed by the embodiments of the present invention effectively reduces the number of times of accessing a memory and thus increases access efficiency of the memory.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A method for processing video data, the video data comprising
  a first frame comprising macroblocks, the method comprising:
    providing a memory;
    deblocking a first macroblock of the first frame into a deblocked macroblock; and
    writing the deblocked macroblock into said memory, comprising consecutively storing all pixel luminance data in the deblocked macroblock into consecutive addresses of a first storage space in the memory.

2. The method according to claim 1, wherein the step of writing the deblocked macroblock into the memory is to determine the addresses to which the plurality of pixel data is written into the memory according to a write starting address of the memory, locations of the plurality of pixel data in the deblocked macroblock and a location of the deblocked macroblock in the first frame.

3. The method according to claim 2, wherein the write starting address corresponds to a first pixel of the first macroblock in the first frame.

4. The method according to claim 2, wherein the deblocked macroblock is MB(i, j), where i is an integer from 0 to I−1, j is an integer from 0 to J−1, and i and j represent a location of the deblocked macroblock MB(i, j) in the first frame; one pixel data is Di, j(m, n), where m is an integer from 0 to M−1, n is an integer from 0 to N−1, and m and n represent a pixel location of the pixel data Di, j(m, n) in the deblocked macroblock MB(i, j); the step of determining the address for writing the pixel data Di, j(m, n) into the memory is performed according to an equation: ADS+J*M*N*I+M*N*J+N*m+n, where ADS is the write starting address, I is a total number of rows of macroblocks in the first frame, J is a total number of macroblocks of one row in the first frame, M is a total number of rows of pixels in one macroblock, and N is a total number of pixels of one row in a macroblock.

5. The method according to claim 1, wherein the video data further comprises a second frame formed by a plurality of macroblocks, the method further comprising:
   determining an access starting address of the memory according to a motion vector; and
   accessing data of a plurality of pixels of a second macroblock of the first frame from a second storage space at consecutive addresses starting from the access starting address to generate a reference macroblock of the second frame.

6. The method according to claim 5, further comprising:
   acquiring a part of the data of said plurality of pixels accessed, and accordingly generating a part of the second frame.

7. The method according to claim 1, wherein the data of said plurality of pixels of the deblocked macroblock comprises pixel data of a top field and pixel data of a bottom field; the method further comprising writing the pixel data of the top and bottom fields in alternating rows into the storage space at the consecutive addresses of the memory.

8. The method according to claim 1, wherein the deblocked macroblock comprises a plurality of first-color pixel data and a plurality of second-color pixel data; the first-color and the second-color pixel data is written in alternating colors into the storage space at the consecutive addresses of the memory.

9. An apparatus for processing video data, the video data comprising a first frame comprising macroblocks, the apparatus comprising:
   a memory; and
   a deblocking filter, configured to deblock a first macroblock of the first frame into a deblocked macroblock and to write the deblocked macroblock into the memory by consecutively storing all pixel luminance data in the deblocked macroblock into consecutive addresses of a first storage space in the memory.

10. The apparatus according to claim 9, wherein the deblocking filter determines the addresses to which the plurality of pixel data is written into the memory according to a write starting address of the memory, locations of the plurality of pixel data in the deblocked macroblock and a location of the deblocked macroblock in the first frame.

11. The apparatus according to claim 10, wherein the write starting address corresponds to a first pixel of the first macroblock in the first frame.

12. The apparatus according to claim 10, wherein the deblocked macroblock is MB(i, j), where i is an integer from 0 to I−1, j is an integer from 0 to J−1, and i and j represent a location of the deblocked macroblock MB(i, j) in the first frame; one pixel data is Di, j(m, n), where m is an integer from 0 to M−1, n is an integer from 0 to N−1, and m and n represent a pixel location of the pixel data Di, j(m, n) in the deblocked macroblock MB(i, j); the deblocking filter determines the address for writing the pixel data Di, j(m, n) into the memory according to an equation: ADS+J*M*N*I+M*N*J+N*m+n, where ADS is the write starting address, I is a total number of rows of macroblocks in the first frame, J is a total number of macroblocks of one row in the first frame, M is a total number of rows of pixels in one macroblock, and N is a total number of pixels of one row in a macroblock.

13. The apparatus according to claim 9, wherein the video data further comprises a second frame formed by a plurality of macroblocks, the apparatus further comprising:
   a reference macroblock generator, configured to determine an access starting address of the memory according to a motion vector, and to access data of a plurality of pixels of a second macroblock of the first frame from a second storage space at consecutive addresses starting from the access starting address to generate a reference macroblock of the second frame.

14. The apparatus according to claim 13, further comprising:
   a direct memory access (DMA) engine, configured to access the memory;
   wherein, the reference macroblock generator provides said access starting address to the DMA engine, and accesses the pixel data of the second macroblock of the first frame from the second storage space at consecutive addresses starting from the read starting address via the DMA engine to generate the reference macroblock of the second frame.

15. The apparatus according to claim 13, wherein said reference macroblock generator acquires a part of the data of the plurality of pixels accessed and accordingly generates a part of the second frame.

16. The apparatus according to claim 9, wherein the data of the plurality of pixels of the deblocked macroblock comprises pixel data of a top field and pixel data of a bottom field; the deblocking filter writes the pixel data of the top and bottom fields in alternating rows into the storage space at the consecutive addresses of the memory.

17. The apparatus according to claim 9, wherein the deblocked macroblock comprises a plurality of first-color pixel data and a plurality of second-color pixel data; the deblocking filter writes the first-color and the second-color pixel data in alternating colors into the storage space at the consecutive addresses of the memory.

* * * * *